US012300430B2

(12) United States Patent
Takeda et al.

(10) Patent No.: US 12,300,430 B2
(45) Date of Patent: May 13, 2025

(54) MAGNET HOLDING DEVICE, MAGNETIZATION DEVICE, AND MAGNETIZING METHOD

(71) Applicant: Yokogawa Electric Corporation, Musashino (JP)

(72) Inventors: Shoma Takeda, Musashino (JP); Shoichi Shiosaki, Musashino (JP); Fumitake Terao, Musashino (JP); Masahito Tsukano, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 135 days.

(21) Appl. No.: 18/127,134

(22) Filed: Mar. 28, 2023

(65) Prior Publication Data

US 2023/0317339 A1 Oct. 5, 2023

(30) Foreign Application Priority Data

Apr. 4, 2022 (JP) ................................ 2022-062245

(51) Int. Cl.
*H01F 7/02* (2006.01)
*H01F 13/00* (2006.01)

(52) U.S. Cl.
CPC ........... *H01F 7/0221* (2013.01); *H01F 13/00* (2013.01)

(58) Field of Classification Search
CPC ...... H01F 13/003; H01F 7/021; H01F 7/0273; H01F 7/0294; H01F 13/00; H01F 7/0221; H01F 7/00; H01F 7/02; G01N 27/84
See application file for complete search history.

(56) References Cited

U.S. PATENT DOCUMENTS

| | | | | |
|---|---|---|---|---|
| 4,941,236 A | 7/1990 | Sherman et al. | | |
| 5,319,335 A * | 6/1994 | Huang | .................. | H01F 7/0268 335/284 |
| 7,679,480 B2 * | 3/2010 | Stenerson | ............. | H01F 13/003 324/345 |
| 2006/0038647 A1 | 2/2006 | Wooten | | |
| 2021/0074459 A1 | 3/2021 | Ji | | |

(Continued)

FOREIGN PATENT DOCUMENTS

| | | |
|---|---|---|
| CN | 102360696 A * | 2/2012 |
| JP | 2000-210386 A | 8/2000 |
| JP | 2006-020494 A | 1/2006 |

(Continued)

OTHER PUBLICATIONS

Extended (Supplementary) European Search Report dated Aug. 17, 2023, issued in counterpart EP Application No. 23165904.6. (4 pages).

(Continued)

*Primary Examiner* — Mohamad A Musleh
(74) *Attorney, Agent, or Firm* — WHDA, LLP

(57) ABSTRACT

A magnetization device and the like appropriate for various magnetization requirements are more easily provided. Provided is a magnet holding device that is capable of holding a magnet. The magnet holding device includes a ring-shaped portion that is openable/closable and an open/close mechanism allowed to keep the ring-shaped portion in a closed state. The magnet is arrangeable in the ring-shaped portion, and the number of the magnets to be arranged is variable.

8 Claims, 15 Drawing Sheets

(56) References Cited

U.S. PATENT DOCUMENTS

| | | | |
|---|---|---|---|
| 2021/0382009 | A1 | 12/2021 | Itoi et al. |
| 2023/0108846 | A1 | 4/2023 | Mito et al. |

FOREIGN PATENT DOCUMENTS

| | | | |
|---|---|---|---|
| JP | 2019-114696 | A | 7/2019 |
| JP | 2021-144015 | A | 9/2021 |
| WO | 2018109824 | A1 | 6/2018 |

OTHER PUBLICATIONS

Office Action dated Mar. 12, 2024, issued in counterpart JP Application No. 2022-062245, with English translation. (6 pages).

* cited by examiner

MAGNET HOLDING DEVICE, MAGNETIZATION DEVICE, AND MAGNETIZING METHOD

CROSS REFERENCE TO RELATED APPLICATIONS

The present application claims priority from Japanese patent application JP 2022-062245 filed on Apr. 4, 2022, the entire content of which is hereby incorporated by reference into this application.

BACKGROUND

Technical Field

The present invention relates to a magnet holding device, a magnetization device, and a magnetizing method.

Background Art

A measurement by magnetism can be employed for detecting wall thinning of a pipe caused by corrosion or the like. First, the pipe is magnetized, and its magnetic-flux density before the wall thinning is measured in advance. Afterwards, upon inspection, the magnetic-flux density around the pipe is measured again, and the wall thinning of the pipe can be detected based on a change in the magnetic-flux density.

FIG. 9 illustrates an exemplary configuration of a magnet M1 used in the measuring method. The magnet M1 is constituted of two half-doughnut shaped components.

FIG. 10A and FIG. 10B illustrate exemplary configurations of a magnetization device 300 including the magnet M1. The magnet M1 is fixed by an outer shell component 310 and a resin member 320. The outer shell component 310 is openable/closable by a buckle 330 and a hinge 340. FIG. 10A illustrates a state where the buckle 330 is open, and FIG. 10B illustrates a state where the buckle 330 is engaged. The magnetization device 300 can be opened/closed and moved by gripping a handle 350.

Since the magnet M1 is used in a size according to a size of the pipe, the magnet M1 having various sizes is required. JP 2019-114696 A discloses a method for manufacturing a large-sized magnet.

SUMMARY

However, in the conventional technique, there has been a problem that a magnetization device appropriate for various magnetization requirements is difficult to be provided.

For example, according to a diameter or a required magnetization capability of a pipe, magnets having various configurations are required to be prepared. However, in the method of JP 2019-114696 A, the magnet needs to be remade for each pipe, and it is difficult to flexibly change the configuration of the magnet.

The present invention provides a magnetization device appropriate for various magnetization requirements. In addition, the present invention provides a magnet holding device and a magnetizing method related to the magnetization device.

One example of a magnet holding device according to the present invention is a magnet holding device capable of holding a magnet, comprising:

a ring-shaped portion that is openable/closable; and an open/close mechanism allowed to keep the ring-shaped portion in a closed state, wherein at least one magnet is arrangeable in the ring-shaped portion, and a number of the magnets to be arranged is variable.

In one example, the magnet has a columnar shape, and a plurality of the magnets are arrangeable along a circumferential direction of the ring-shaped portion.

In one example, the ring-shaped portion includes a plurality of unit components, each of the unit components is capable of holding the magnet, and each of the unit components is rotatably coupled to another adjacent unit component of the plurality of unit components.

In one example, a number of the unit components included in the ring-shaped portion is variable to change a size of the ring-shaped portion.

In one example, a magnetization amount by the magnets is changeable by changing a number of the magnets.

In one example, the open/close mechanism includes a coupling component disposed in both ends in the circumferential direction of the ring-shaped portion.

One example of a magnetization device according to the present invention comprises the above-described magnet holding device and a magnet to be arranged in the magnet holding device.

One example of a magnetizing method according to the present invention is a magnetizing method of magnetizing an object using the above-described magnetization device, comprising:

arranging the object in the ring-shaped portion in a state where the ring-shaped portion is open;

attaching the magnetization device to the object by closing the ring-shaped portion using the open/close mechanism after the arranging;

relatively moving the magnetization device with respect to the object in a state where the magnetization device is attached to the object;

opening the ring-shaped portion using the open/close mechanism after the moving; and detaching the magnetization device from the object after the opening.

With the magnet holding device, the magnetization device, and the magnetizing method according to the present invention, a magnetization device appropriate for various magnetization requirements can be more easily provided.

DETAILED DESCRIPTION

The following describes an embodiment of the present invention based on the attached drawings.

Embodiment 1

Figure 1:
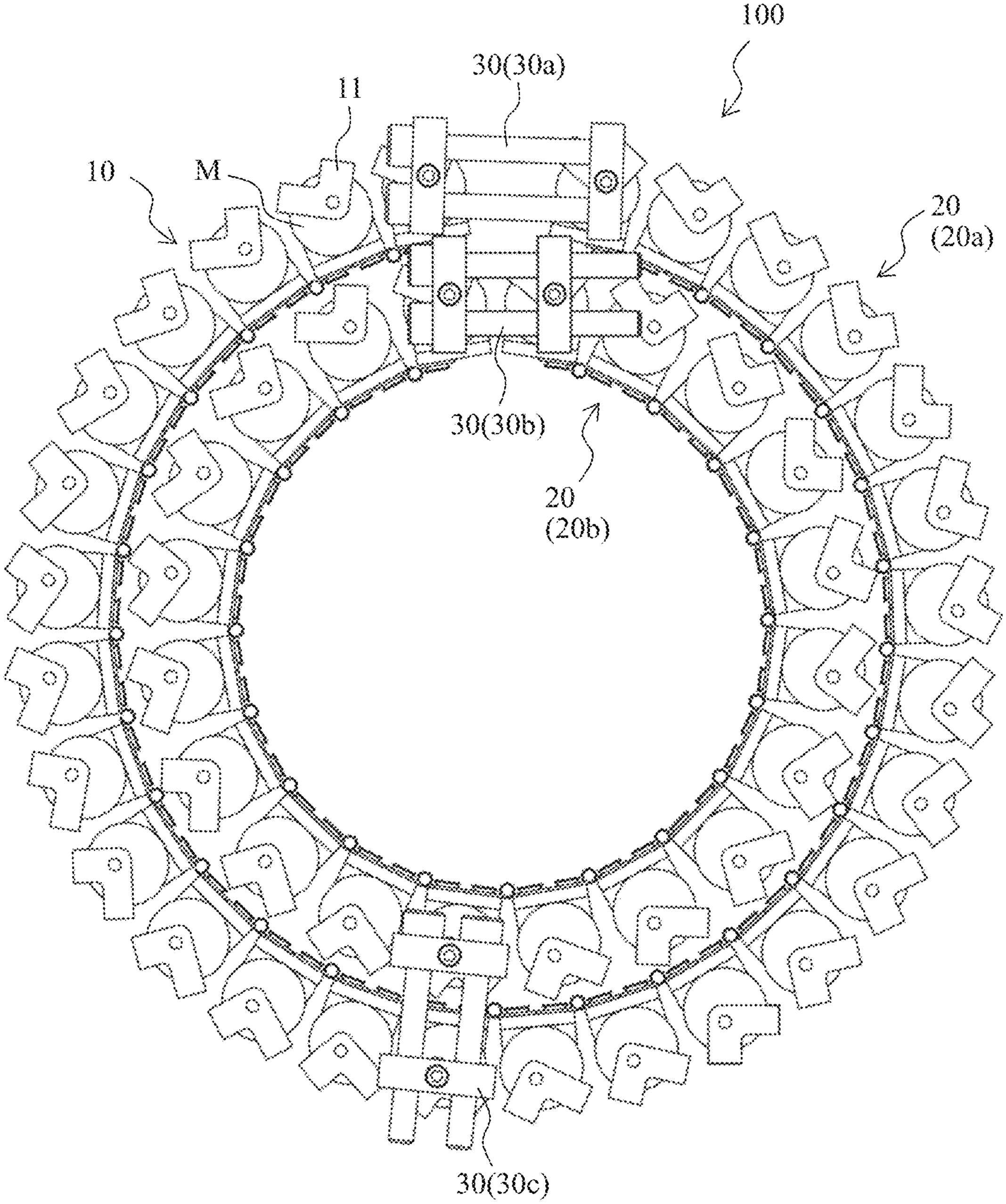
FIG. 1 is an exemplary configuration of a magnetization device according to Embodiment 1 of the present invention.
Figure 2:
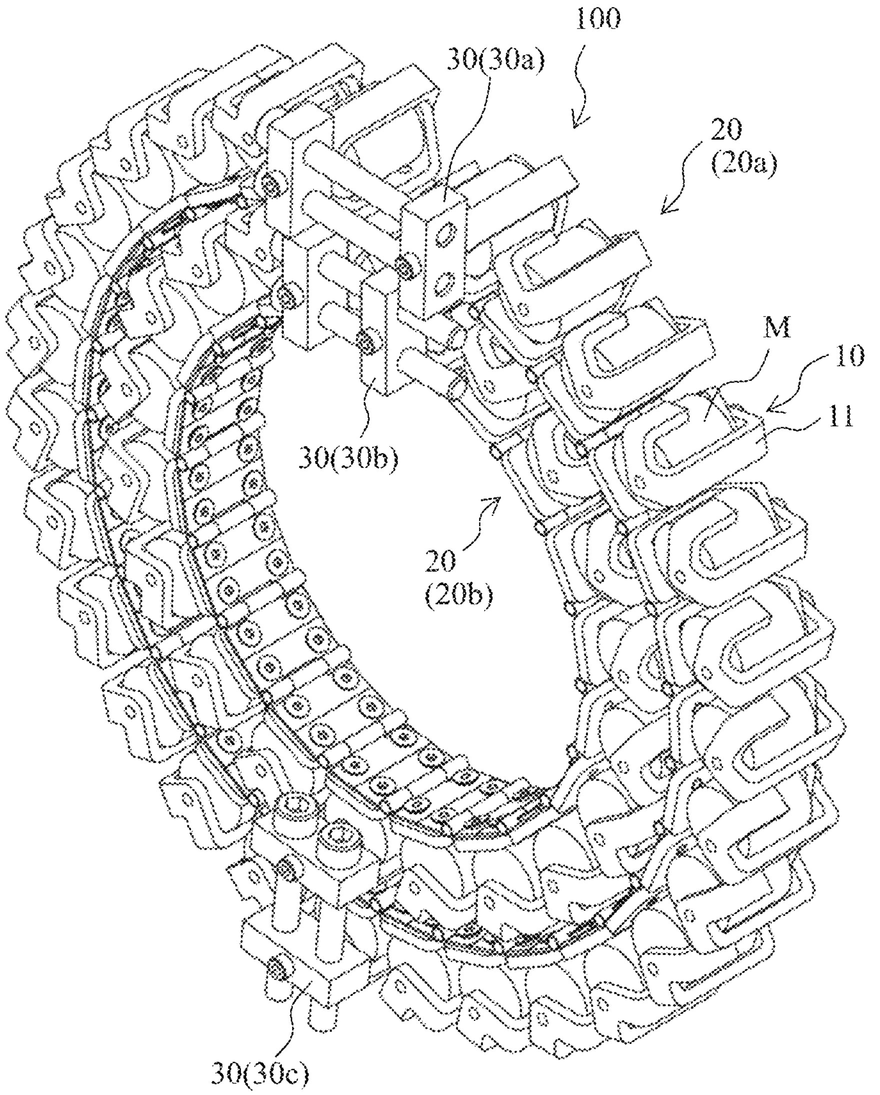
FIG. 2 is a drawing of the magnetization device in FIG. 1 viewed from a different angle.

FIG. 1 illustrates an exemplary configuration of a magnetization device 100 according to Embodiment 1 of the present invention. FIG. 2 is a drawing of the magnetization device 100 viewed from an angle different from that of FIG. 1.

The magnetization device 100 includes a magnet holding device 10 and a plurality of magnets M. The magnet holding device 10 is capable of holding the plurality of magnets M, and the magnets M are arranged in the magnet holding device 10. The magnet M is a permanent magnet as an example, and may also be what is called a general-purpose magnet. While the magnet M has a columnar shape in the present embodiment, it may also have another shape.

The magnet holding device 10 includes a ring-shaped portion 20 that is openable/closable. In the present embodiment, the ring-shaped portion 20 is constituted of two layers, and includes an outer ring-shaped portion 20*a* and an inner ring-shaped portion 20*b*. The ring-shaped portion 20 includes a plurality of unit components 11, and is configured by the respective unit components 11 being coupled in a ring shape. The unit components 11 can each hold the magnet M. Thus, the magnet M is arrangeable in the ring-shaped portion 20, and particularly, a plurality of the magnets M are arrangeable along a circumferential direction of the ring-shaped portion 20.

Note that, in the present specification, a "circumferential direction," a "radial direction," and an "axial direction" respectively corresponds to a circumferential direction, a radial direction, and an axial direction of a circular ring when the ring-shaped portion 20 is coupled so as to form the circular ring. However, even when the ring-shaped portion 20 does not form a true circle, these directions are appropriately definable. For example, when the ring-shaped portion 20 is arranged so as to form a ring on a planar surface, a direction perpendicular to the planar surface can be assumed to be the axial direction, and the radial direction and the circumferential direction can be defined with a predetermined position (a point inside the ring-shaped portion 20, for example) on the planar surface as reference.

The magnet holding device 10 includes an open/close mechanism. The open/close mechanism includes coupling components 30 (more precisely, in the present embodiment, at least one of the coupling components 30 works as the open/close mechanism). The coupling component 30 is disposed on both ends in the circumferential direction of the ring-shaped portion 20, and is configured to be able to keep the ring-shaped portion 20 in a closed state.

In the examples of FIG. 1 and FIG. 2, both ends in the circumferential direction of the outer ring-shaped portion 20*a* are coupled and fixed by a coupling component 30*a*, and thereby the outer ring-shaped portion 20*a* is closed. Similarly, both ends in the circumferential direction of the inner ring-shaped portion 20*b* are coupled and fixed by a coupling component 30*b*, and thereby the inner ring-shaped portion 20*b* is closed.

The coupling component 30 may have functions besides as the open/close mechanism. In the present embodiment, a coupling component 30*c* couples and fixes the outer ring-shaped portion 20*a* and the inner ring-shaped portion 20*b* with one another. Moreover, while the coupling component 30*a* and the coupling component 30*b* as the open/close mechanism, and the coupling component 30*c* for coupling the plurality of ring-shaped portions with one another are coupling components having the same structure in the present embodiment, the coupling component 30*a*, the coupling component 30*b*, and the coupling component 30*c* may be coupling components having different structures. That is, the coupling in the circumferential direction and the coupling in the radial direction of the ring-shaped portion can be implemented by coupling components having different structures.

Figure 3A:
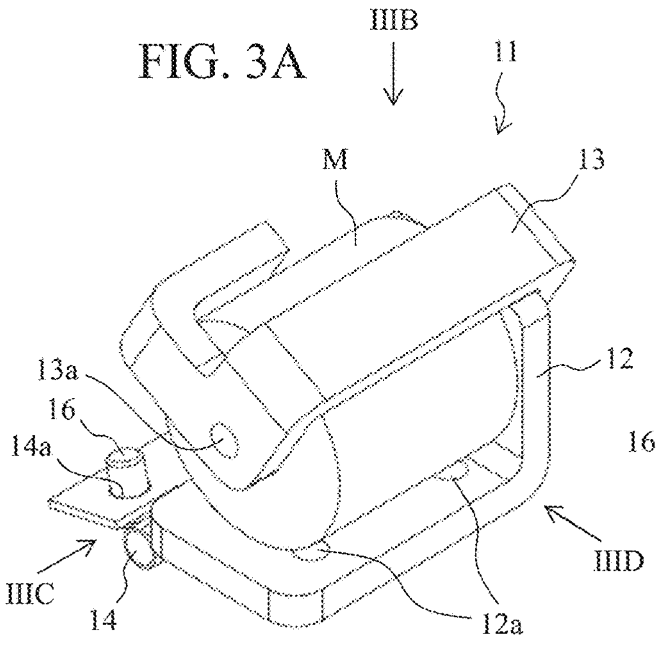
FIG. 3A to FIG. 3D are exemplary configurations of a unit component in FIG. 1.
Figure 3B:
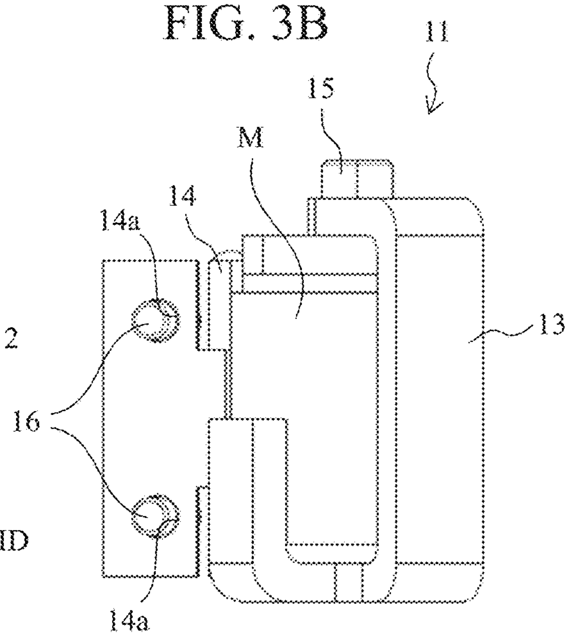
Figure 3C:
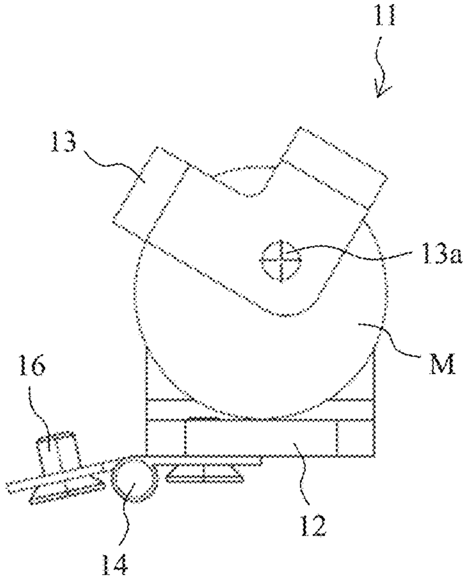
Figure 3D:
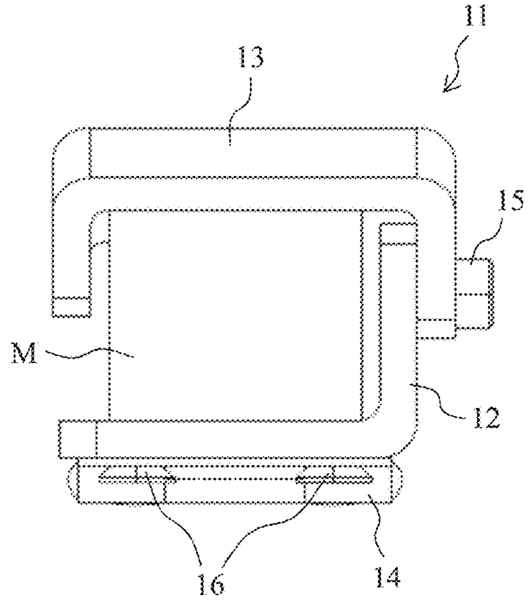

FIG. 3A to FIG. 3D illustrate exemplary configurations of the unit component 11. FIG. 3A is a perspective view, FIG. 3B is a drawing (top view) of FIG. 3A viewed in the IIIB-direction, FIG. 3C is a drawing (front view) of FIG. 3A viewed in the IIIC-direction, and FIG. 3D is a drawing (side view) of FIG. 3A viewed in the IIID-direction.

The unit component 11 includes a pedestal 12, a fixed component 13, a hinge 14, and a fixation screw 15. The pedestal 12, the fixed component 13, the hinge 14, and the fixation screw 15 are constituted of a non-magnetic body, for example, and as a specific example, they are constituted of stainless steel. The fixation screw 15 fixes the pedestal 12 and the fixed component 13, and thereby the magnet M is fixed between the pedestal 12 and the fixed component 13.

Note that, when using the magnet M having a column shape, a magnetization direction of the magnet M can be an axial direction of the column. However, it is preferable for the magnetization direction of the magnet M to coincide with the axial direction of the ring-shaped portion 20.

A coupling of adjacent unit components 11 will be described using FIG. 4. The unit component 11 is rotatably coupled to another adjacent unit component 11 by the hinge 14. For example, connecting holes 14*a* as illustrated in FIG. 3A and FIG. 3B are formed in the hinge 14, and coupling screws 16 are inserted through these connecting holes 14*a*. In addition, connecting holes 12*a* illustrated in FIG. 3A are formed in the pedestal 12.

Figure 4:
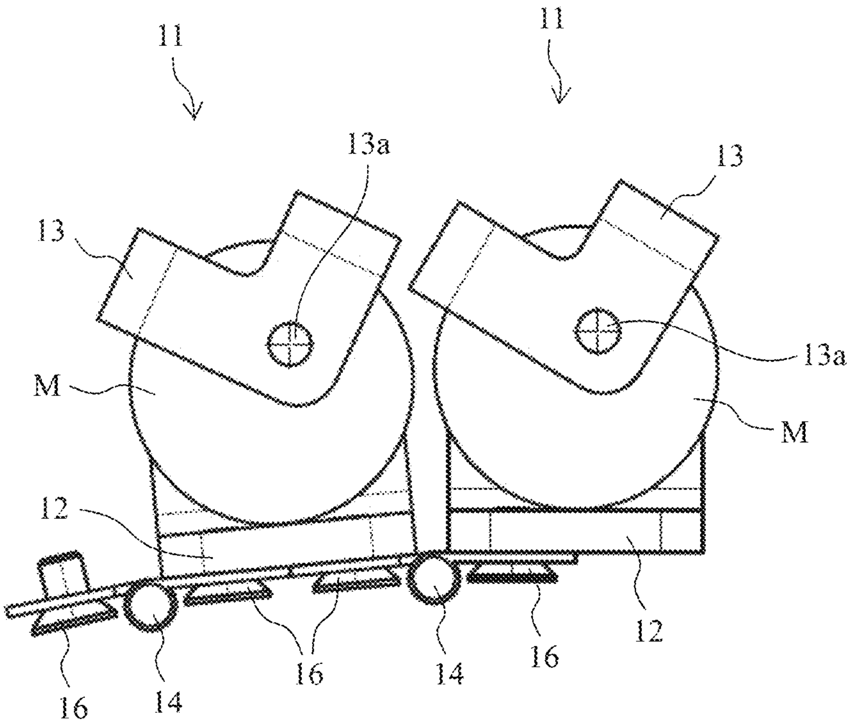
FIG. 4 is a drawing describing a coupling of adjacent unit components.

As illustrated in FIG. 4, the coupling screws 16 are screwed with the connecting holes 12*a* of an adjacent second unit component 11 via the connecting holes 14*a* of a first unit component 11. Thus, two unit components 11 are fastened and coupled. Similarly, more unit components 11 are successively coupled, and the ring-shaped portion 20 can be constituted of any number of the unit components 11.

The coupling of the adjacent unit components 11 can be released by detaching the coupling screws 16. Thus, since the respective unit components 11 are detachably coupled, the number of the unit components 11 included in the ring-shaped portion 20 is variable, and thereby the size (diameter, for example) of the ring-shaped portion 20 is changeable.

In the example of FIG. 3A, to FIG. 3D, two of each of the connecting hole 14*a* and the connecting hole 12*a* are presented. However, four of each of the connecting hole 14*a* and the connecting hole 12*a* including those that are in positions not presented in FIG. 3A to FIG. 3D are disposed. That is, while the connecting holes 14*a* and the connecting holes 12*a* in positions where the hinge 14 and the pedestal 12 overlap are hidden and cannot be seen in FIG. 3A to FIG. 3D, as illustrated in FIG. 3C, the coupling screws 16 are used to fasten and fix the hinge 14 and the pedestal 12.

Figure 5A:
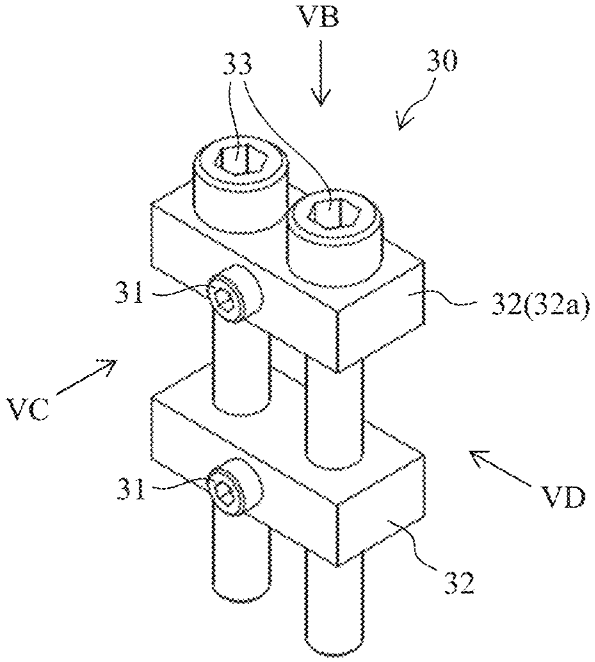
FIG. 5A to FIG. 5D are exemplary configurations of coupling components in FIG. 1.
Figure 5B:
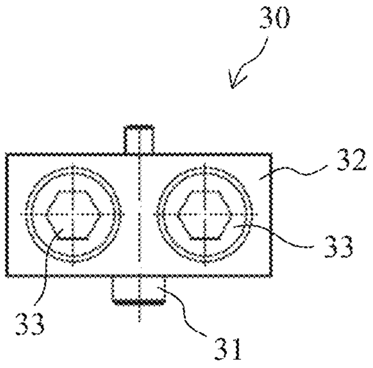
Figure 5C:
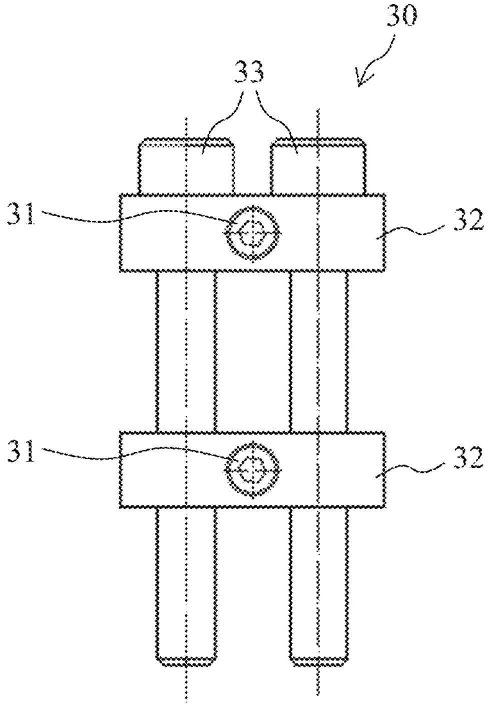
Figure 5D:
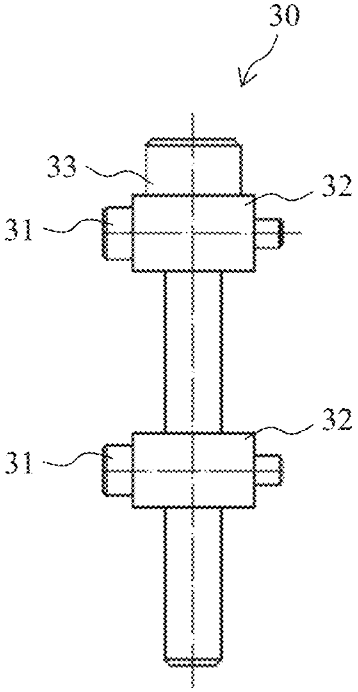

FIG. 5A to FIG. 5D illustrate exemplary configurations of the coupling component 30. FIG. 5A is a perspective view, FIG. 5B is a drawing (top view) of FIG. 5A viewed in a VB direction, FIG. 5C is a drawing (front view) of FIG. 5A viewed in a VC-direction, and FIG. 5D is a drawing (side view) of FIG. 5A viewed in a VD-direction.

The coupling component 30 includes two coupling screws 31, two supporting members 32, and two opening/closing screws 33. The entire coupling component 30 is constituted of a non-magnetic body, for example, and as a specific example, it is constituted of stainless steel.

The respective opening/closing screws 33 are screwed with the supporting members 32, and relatively fix these supporting members 32. In addition, a coupling screw 31 is insertable through the supporting member 32. As illustrated in FIG. 3A to FIG. 3D and FIG. 4, a connecting hole 13*a* is formed in the fixed component 13 of the unit component 11, and the coupling screw 31 can be screwed with the connecting hole 13*a*. Two coupling screws 31 are each fastened to a different unit component 11, and thereby those unit components 11 are coupled to one another. Note that, the supporting member 32 (supporting member 32*a*) that is closer to the heads of the opening/closing screws 33 of the two supporting members 32 may include through holes (what is called clearance holes) for the opening/closing screws 33 to be inserted through instead of screw holes that are screwed with the opening/closing screws 33.

Figure 6:
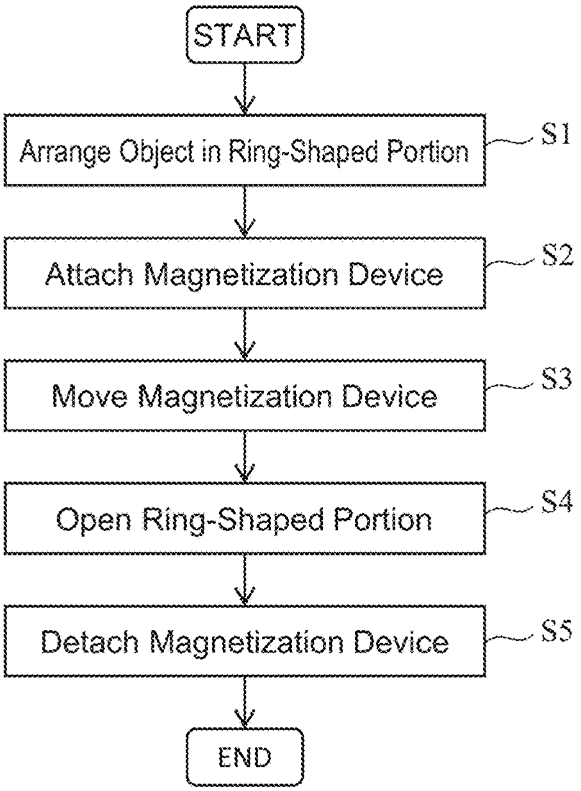
FIG. 6 is a flowchart describing a magnetizing method according to Embodiment 1.
Figure 7:
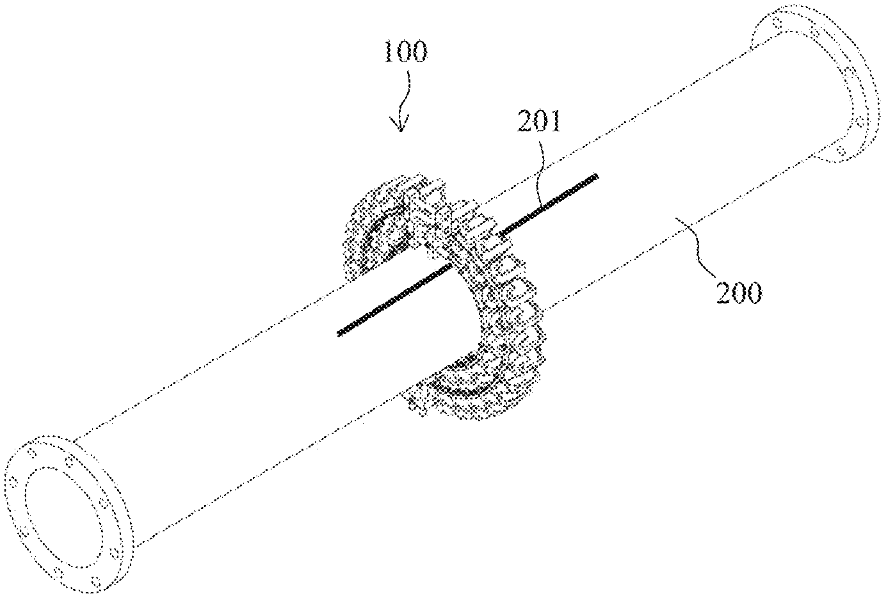
FIG. 7 is a drawing of a halfway state in the magnetizing method in FIG. 6.

A magnetizing method for magnetizing an object using the magnetization device 100 will be described using FIG. 6 and FIG. 7. FIG. 6 is a flowchart describing the magnetizing method according to the present embodiment. FIG. 7 is a drawing of a halfway state in the magnetizing method in FIG. 6. As illustrated in FIG. 7, it is preferable to preliminarily leave a marking 201 indicating a range that is to be magnetized on an object 200 such as a pipe.

The magnetizing method according to the present embodiment includes each step indicated in FIG. 6. First, a user of the magnetization device 100 arranges the object 200 in the ring-shaped portion 20 in a state where the ring-shaped portion 20 is open (Step S1, arranging step). The object 200 is a pipe, for example, and is the target of a magnetization effect of the magnetization device 100.

After Step S1, the user attaches the magnetization device 100 to the object 200 by closing the ring-shaped portion 20 using the coupling component 30 (Step S2, attaching step). For example, the two coupling screws 31 of the coupling component 30 are each fastened to a corresponding unit component 11, and these coupling screws 31 are fixed by the two opening/closing screws 33. Note that, an attachment position of the magnetization device 100 can be one end of the marking 201.

After Step S2, the magnetization device 100 is relatively moved by being slid with respect to the object 200 in a state where the magnetization device 100 is attached to the object 200 (Step S3, moving step). A direction of the movement is, for example, an axial direction of the ring-shaped portion 20 or an axial direction of the object 200 (these directions coincide in the present embodiment). This movement is performed up to another end of the marking 201. FIG. 7 presents a halfway state in this step S3. In Step S1 and Step S3, by the magnets M being arranged with respect to the object 200 and passing through its periphery, the object 200 becomes magnetized.

Thus, by moving the magnetization device 100 in a predetermined axial direction range along the object 200, the object 200 can be magnetized in the axial direction range. Moreover, by attaching the ring-shaped portion holding the plurality of magnets M such that they are wound along the circumferential direction of the object 200, an approximately uniform magnetization in the circumferential direction of the object 200 is possible.

After Step S3, the user opens the ring-shaped portion 20 by the coupling component 30 (Step S4, opening step). More specifically, the two opening/closing screws 33 or at least one of the coupling screws 31 are detached from the coupling component 30.

After Step S4, the user detaches the magnetization device 100 from the object 200 (Step S5, detaching step). Accordingly, the magnetizing method according to the present embodiment is terminated.

In the present embodiment, the magnets M are arrangeable in the ring-shaped portion 20 as described above, and the number of the magnets M to be arranged is variable and appropriately changeable according to the magnetization requirements. For example, since the number of the unit components 11 included in the ring-shaped portion 20 is variable, when the diameter of the object 200 is large or small, the number of the unit components 11 can be increased or decreased according to the diameter to constitute the magnetization device 100 having a size fit for the object 200.

By changing the number of the magnets M with respect to the object 200 having the same size, the magnetization amount by the magnets M is changeable. For example, when magnetization should be decreased with respect to the object 200 having the same size, by not arranging the magnets M in a part of the multiple unit components 11, the number of the magnets M can be decreased and the magnetization capability of the magnetization device 100 can be weakened.

When the magnetization should be increased with respect to the object 200 having the same size, by coupling the unit components 11 not only in the circumferential direction but also the radial direction, the number of the magnets M can be increased and the magnetization capability of the magnetization device 100 as a whole can be strengthened. In the examples of FIG. 1 and FIG. 2, two layers of the unit components 11 in the radial direction are arranged. By making this a single layer, the magnetization capability can be weakened, and by making this three layers or more, the magnetization capability can be strengthened.

As described above, with the magnet holding device 10 and the magnetization device 100 according to Embodiment 1, a magnetization device appropriate for various magnetization requirements can be more easily provided.

A specific example of an effect of the present invention will be described below using FIG. 8A to FIG. 8H. These figures indicate distributions of the magnetic-flux density of the object 200 in the axial direction, and have been obtained as a result of an electromagnetic field analysis using a model. A z-direction in the figures indicates the axial direction of the object 200, and the x-direction and the y-direction indicate the radial direction of the object 200. In a cross-sectional surface of the object 200, the gray becomes dark as the magnetic-flux density increases.

Figure 8A:
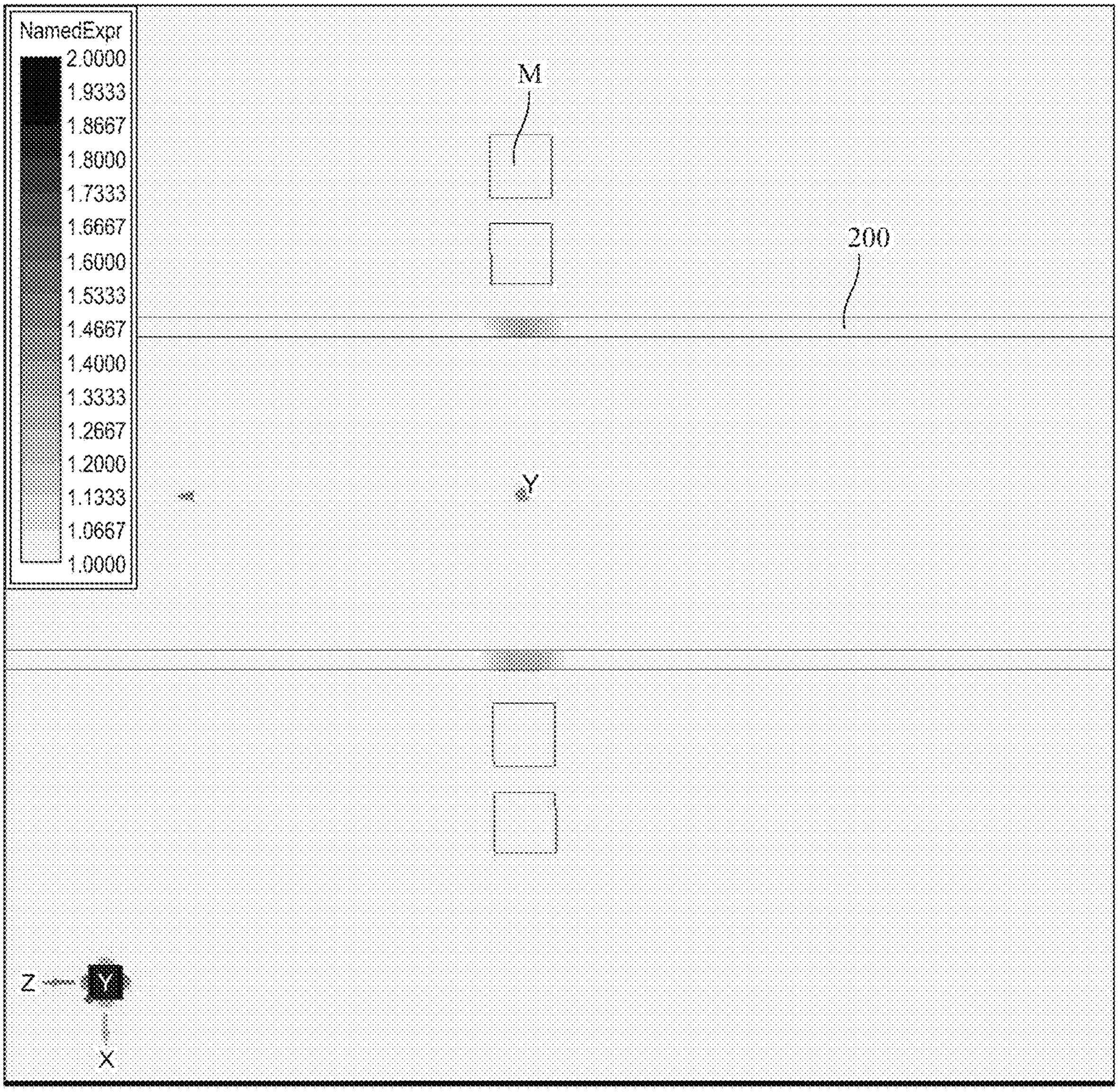
FIG. 8A is a distribution of a magnetic-flux density of the object in an axial direction after magnetizing has been performed by the magnetization device in FIG. 1 (a cross-sectional surface of a planar surface including the axis)
Figure 8B:
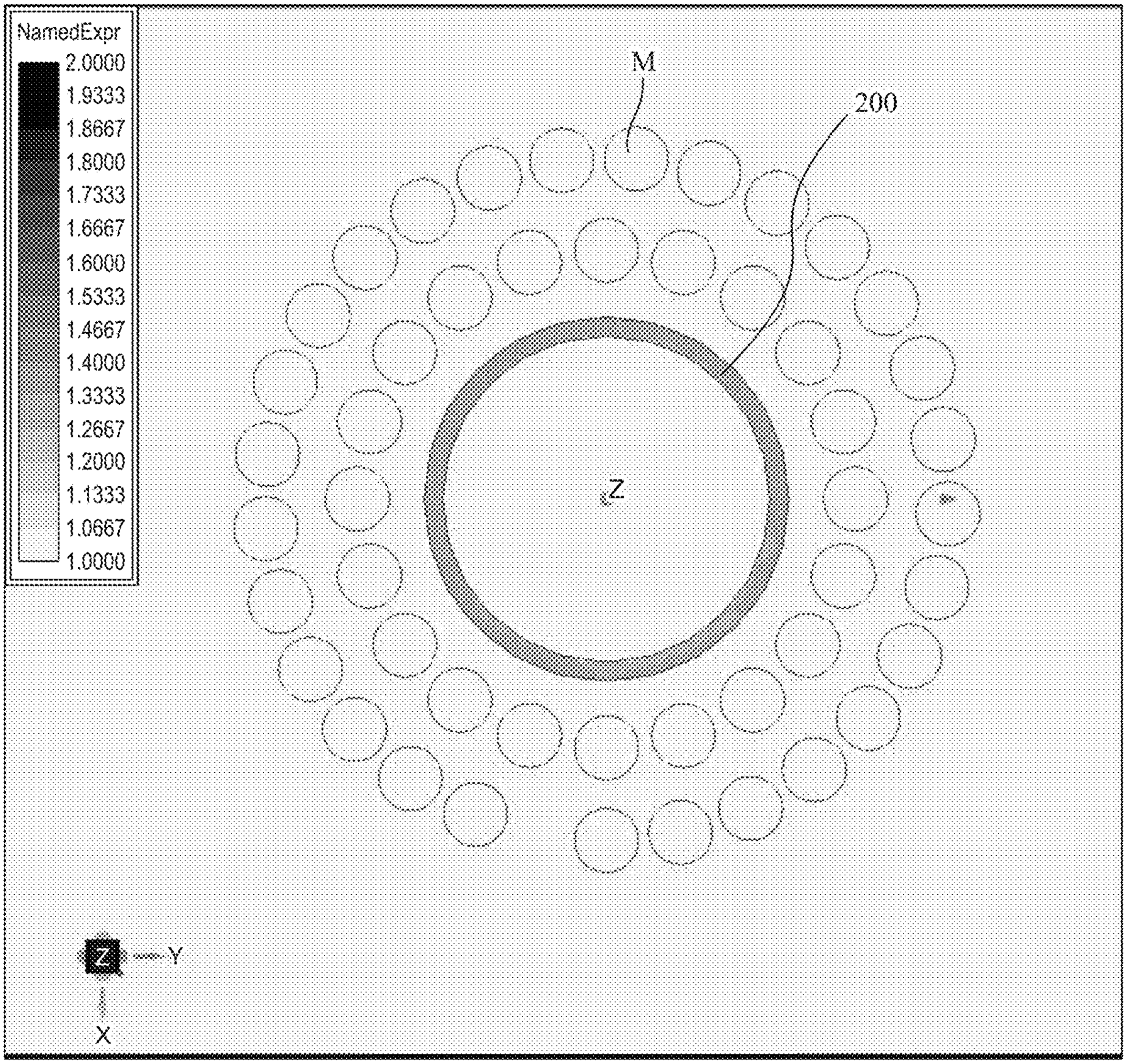
FIG. 8B is a distribution of the magnetic-flux density of the object in a direction perpendicular to the axis after magnetizing has been performed by the magnetization device in FIG. 1 (a cross-sectional surface of a planar surface perpendicular to the axis)

FIG. 8A and FIG. 8B indicate an example of after magnetization has been performed by the magnetization device 100 according to Embodiment 1. In particular, FIG. 8A indicates a distribution of the magnetic-flux density of the object 200 in the axial direction on a cross-sectional surface of a planar surface including the axis of the object 200, and FIG. 8B indicates a distribution of the magnetic-flux density of the object 200 in a direction perpendicular to the axis on a cross-sectional surface of a planar surface perpendicular to the axis of the object 200.

Figure 8C:
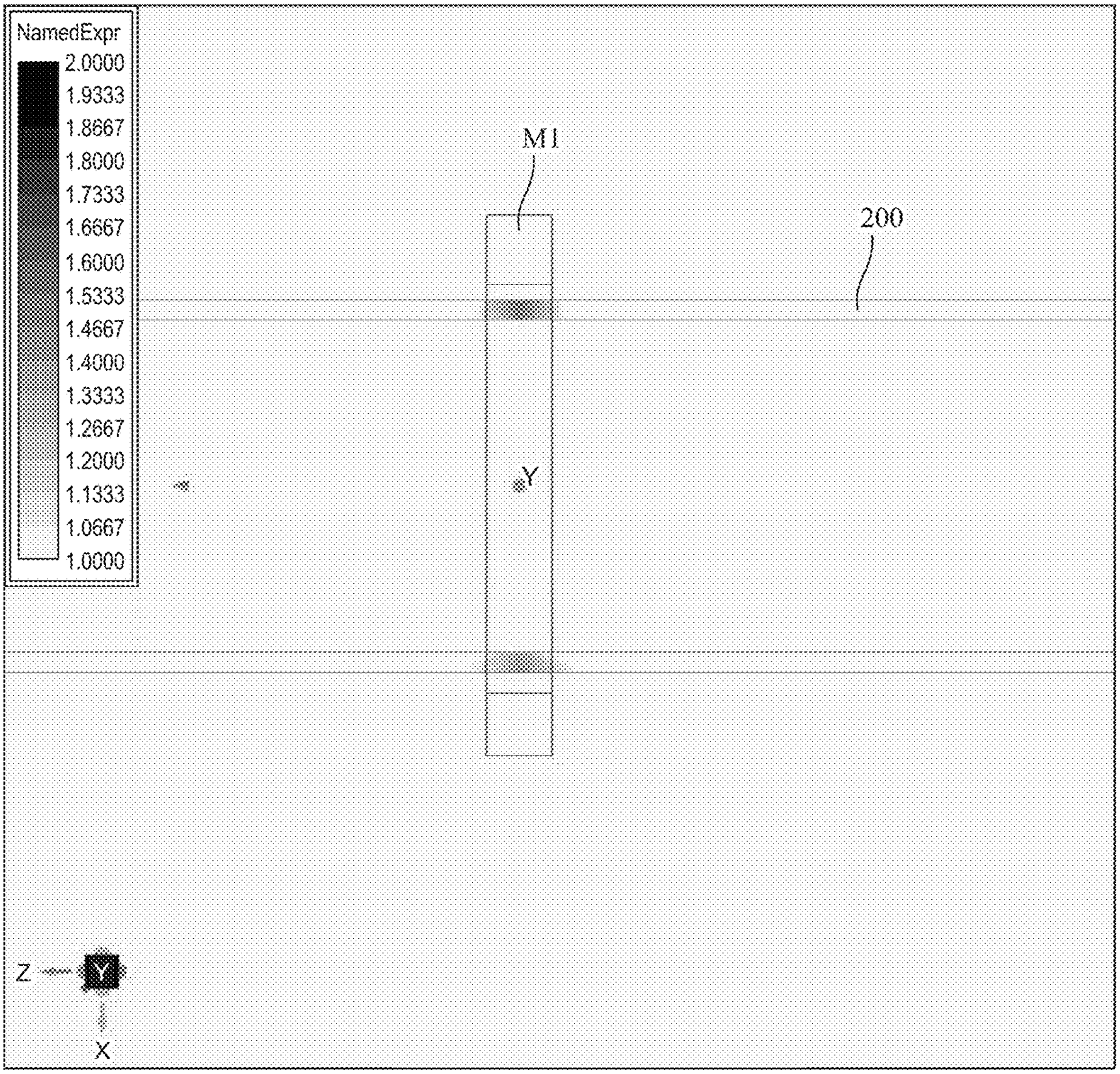
FIG. 8C is a distribution of a magnetic-flux density of the object in the axial direction after magnetizing has been performed by a magnetization device in FIG. 10A and FIG. 10B as a comparative example (a cross-sectional surface of a planar surface including the axis.
Figure 8D:
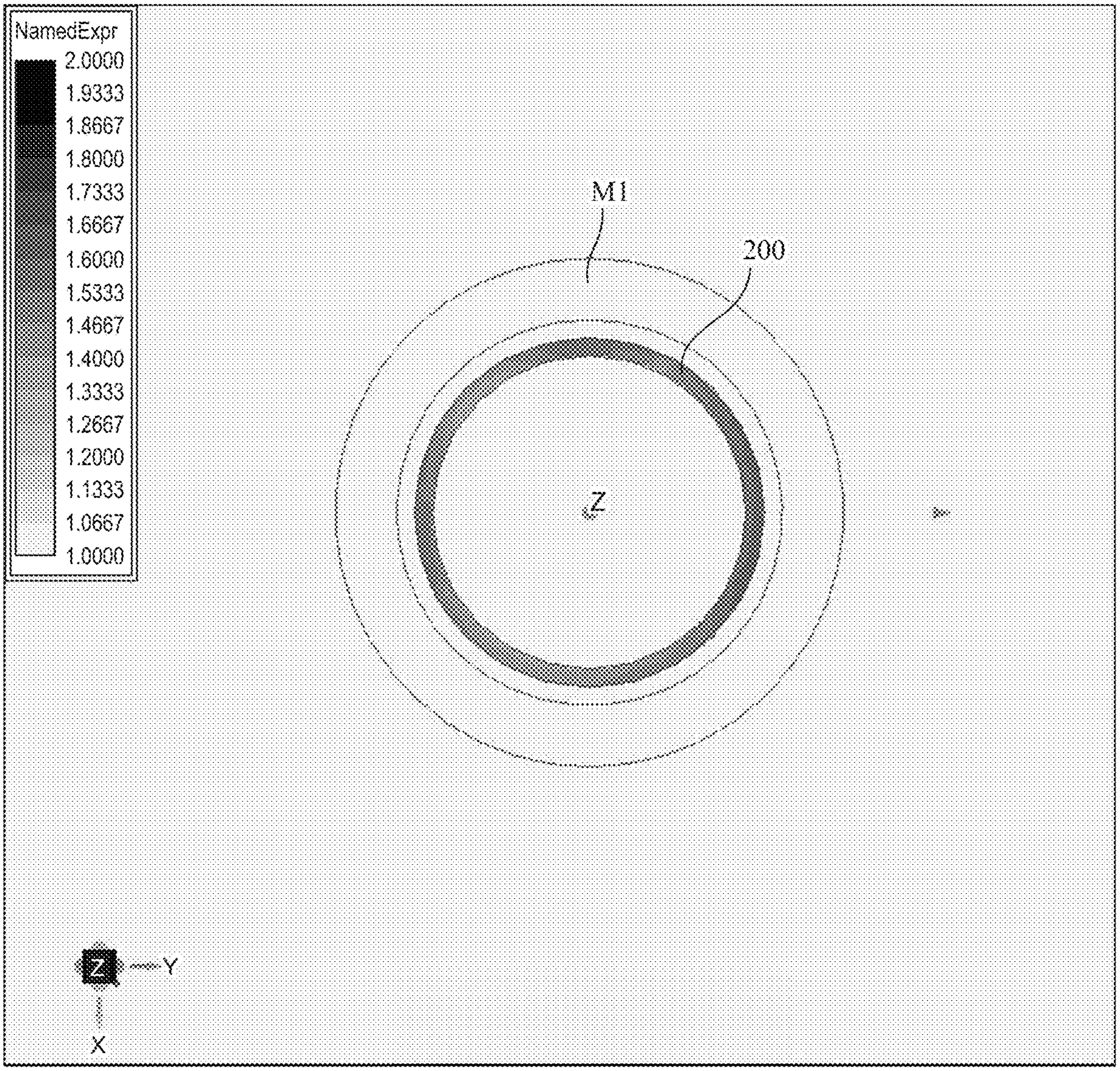
FIG. 8D is a distribution of the magnetic-flux density of the object in the direction perpendicular to the axis after magnetizing has been performed by the magnetization device in FIG. 10A and FIG. 10B as the comparative example (a cross-sectional surface of a planar surface perpendicular to the axis)
Figure 10A:
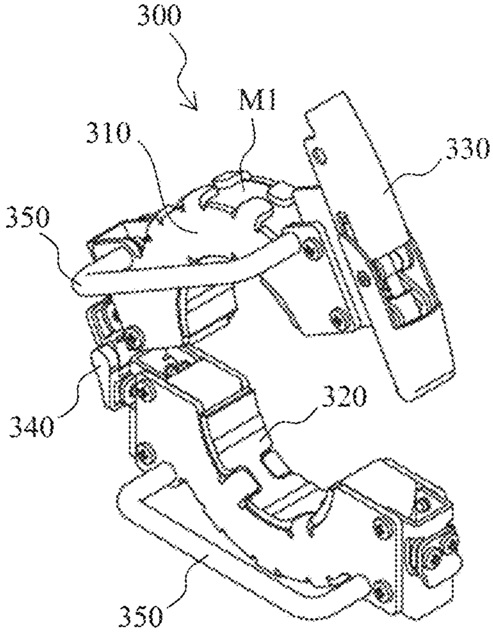
FIG. 10A and FIG. 10B are exemplary configurations of a magnetization device including the magnet in FIG. 9.
Figure 10B:
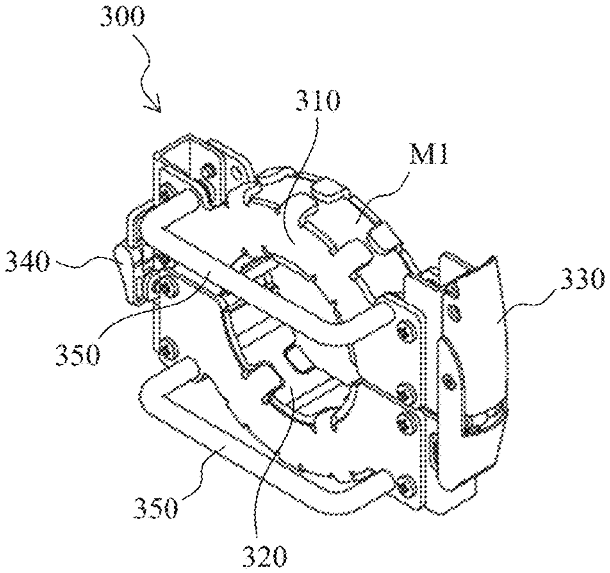

FIG. 8C and FIG. 8D indicate an example of after magnetization has been performed by a magnetization device 300 illustrated in FIG. 10A and FIG. 10B as a comparative example. In particular, FIG. 8C indicates a distribution of a magnetic-flux density of the object 200 in the axial direction on a cross-sectional surface of a planar surface including the axis of the object 200 (corresponding to FIG. 8A), and FIG. 8D indicates a distribution of the magnetic-flux density of the object 200 in a direction perpendicular to the axis on a cross-sectional surface of a planar surface perpendicular to the axis of the object 200 (corresponding to FIG. 8B).

By these results, it can be seen that the magnetization device 100 according to Embodiment 1 has the same degree of magnetization capability as that of the magnetization device 300 according to the comparative example.

Figure 8E:
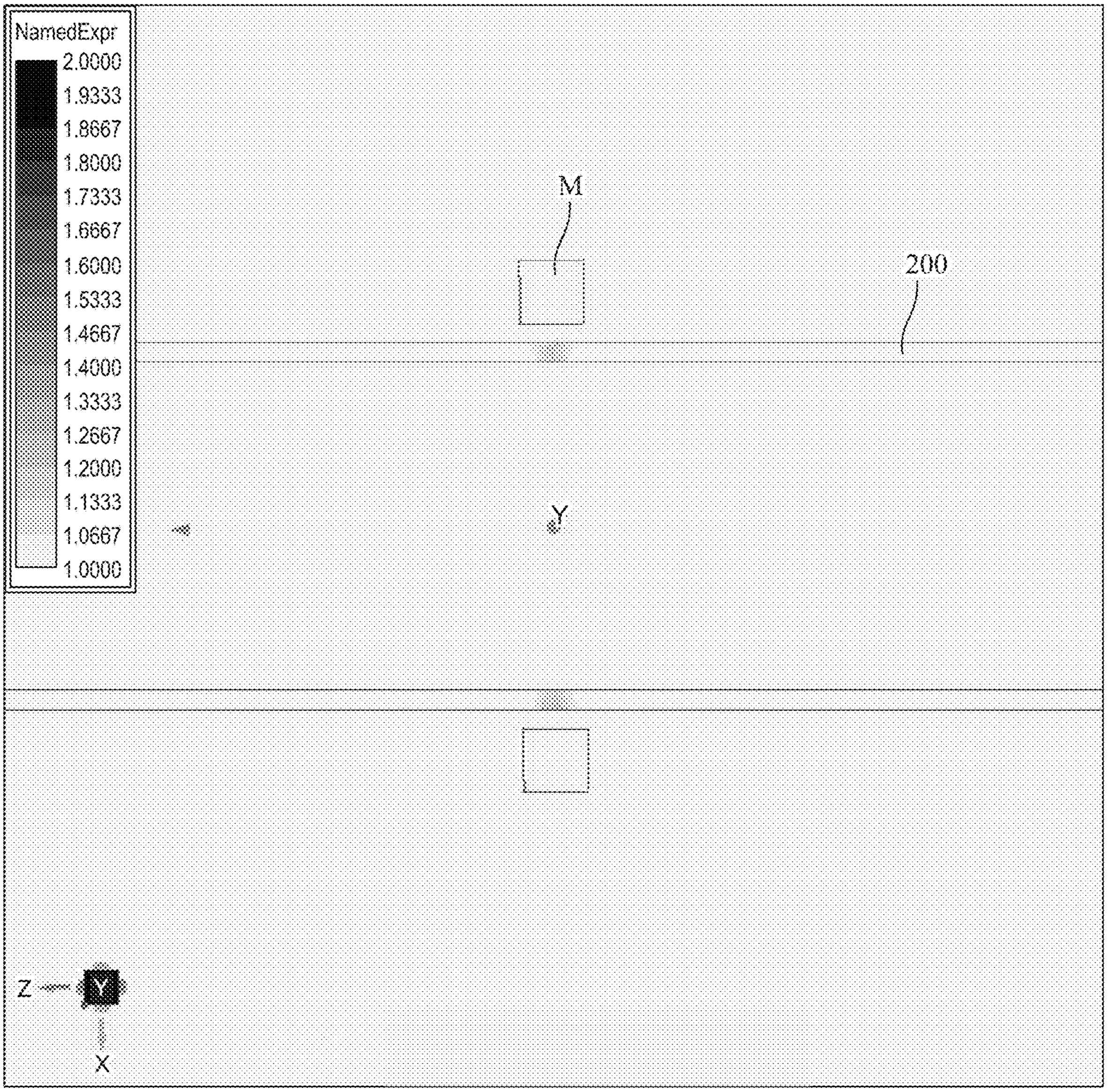
FIG. 8E is a distribution of a magnetic-flux density of the object in the axial direction after magnetizing has been performed by a magnetization device according to a first modified example of Embodiment 1 (a cross-sectional surface of a planar surface including the axis)
Figure 8F:
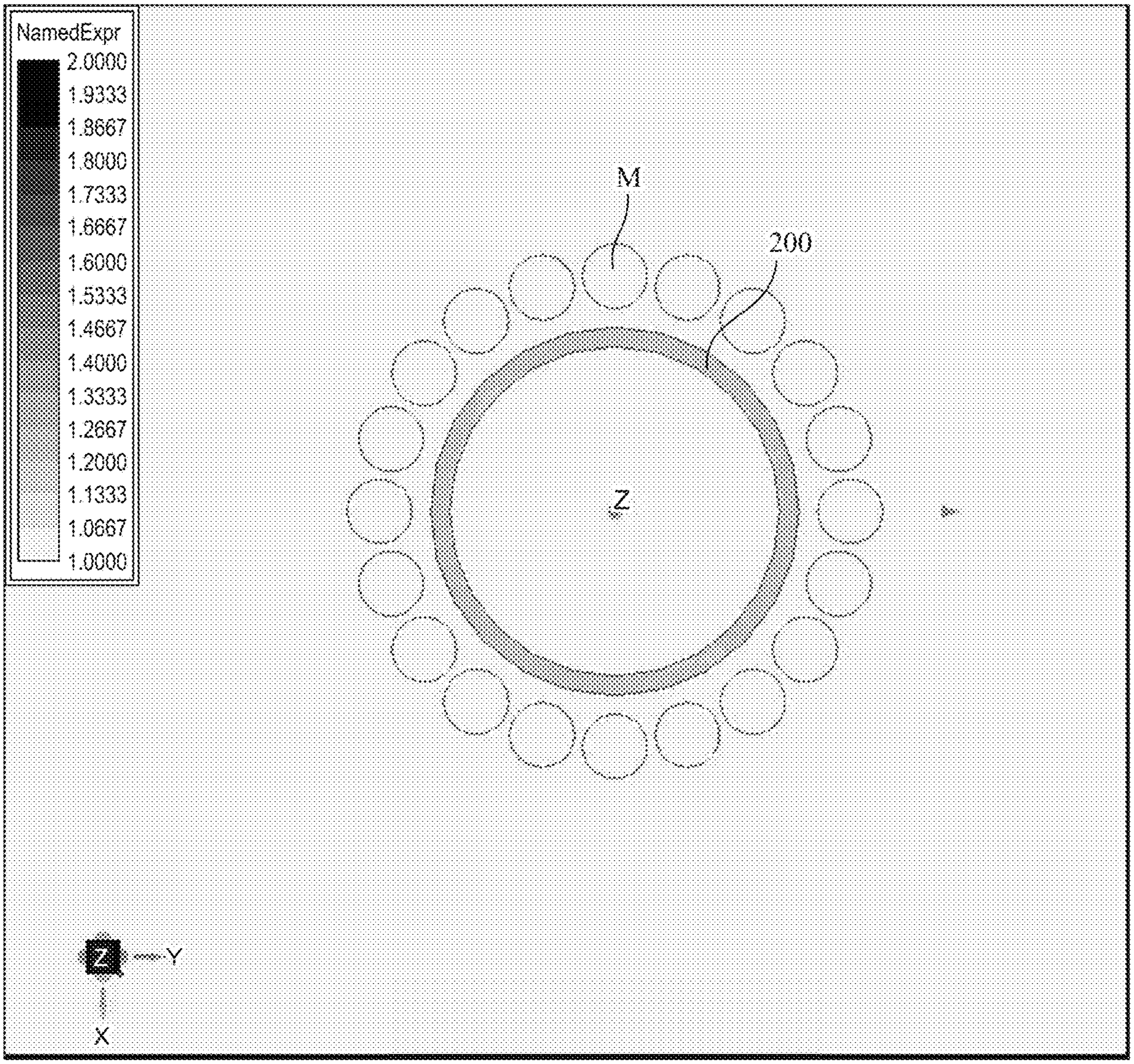
FIG. 8F is a distribution of the magnetic-flux density of the object in the direction perpendicular to the axis after magnetizing has been performed by the magnetization device according to the first modified example of Embodiment 1 (a cross-sectional surface of a planar surface perpendicular to the axis)

FIG. 8E and FIG. 8F indicate an example of after magnetization has been performed by the magnetization device according to a first modified example of Embodiment 1. In the first modified example, the ring-shaped portion 20 has a single layer (that is, the outer ring-shaped portion 20*a* is omitted). FIG. 8E indicates a distribution of a magnetic-flux density of the object 200 in the axial direction on a cross-sectional surface of a planar surface including the axis of the object 200, and FIG. 8F indicates a distribution of the magnetic-flux density of the object 200 in the direction perpendicular to the axis on a cross-sectional surface of a planar surface perpendicular to the axis of the object 200.

By comparing FIG. 8A with FIG. 8E, and comparing FIG. 8B with FIG. 8F, it can be seen that the layers of the ring-shaped portion 20 has decreased, and therefore, by the number of the magnets M having decreased, the magnetization capability has weakened. Thus, the magnetization capability is easily adjustable according to the required magnetization amount.

Figure 8G:
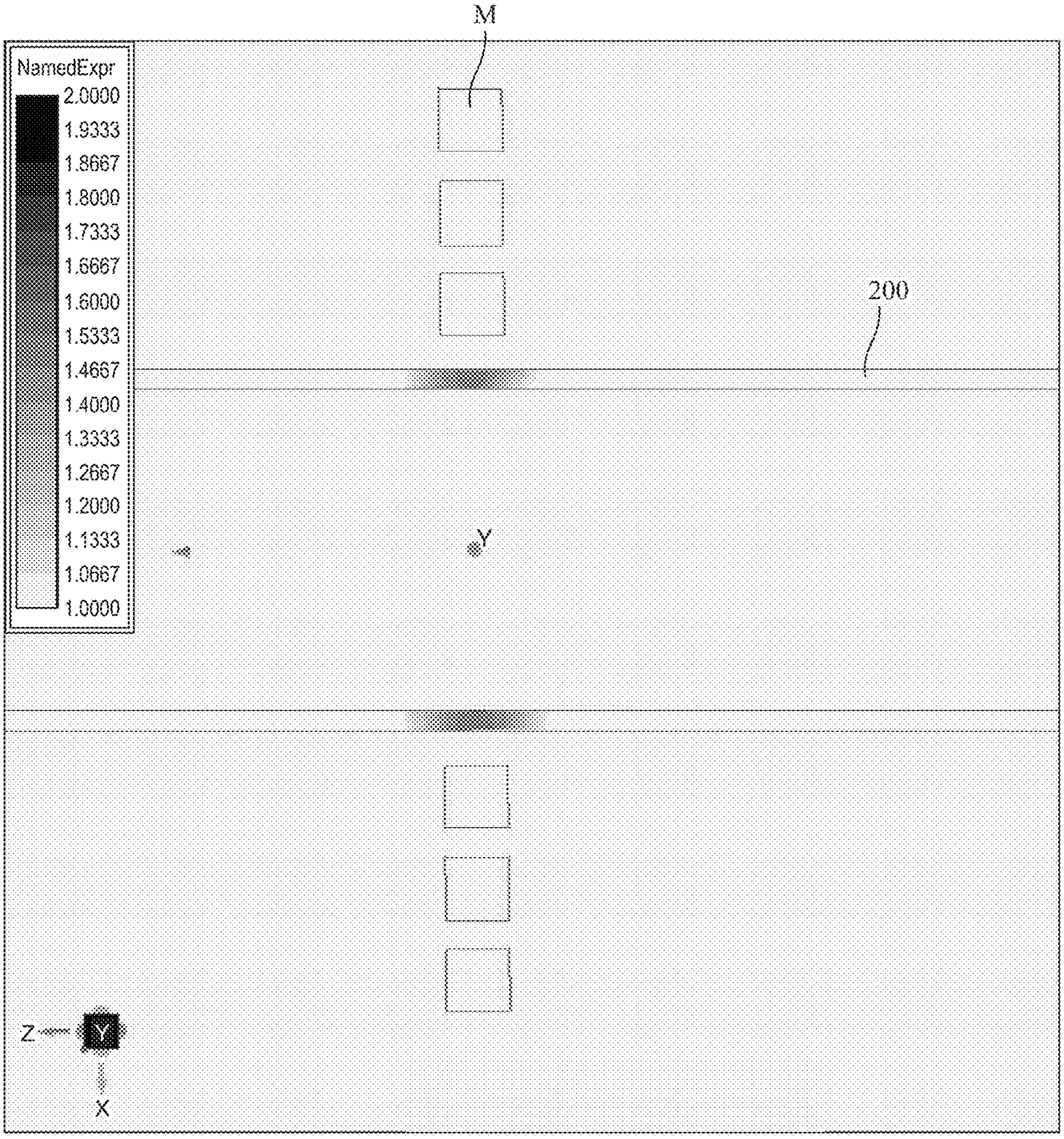
FIG. 8G is a distribution of a magnetic-flux density of the object in the axial direction after magnetizing has been performed on a magnetization device according to a second modified example of Embodiment 1 (a cross-sectional surface of a planar surface including the axis)
Figure 8H:
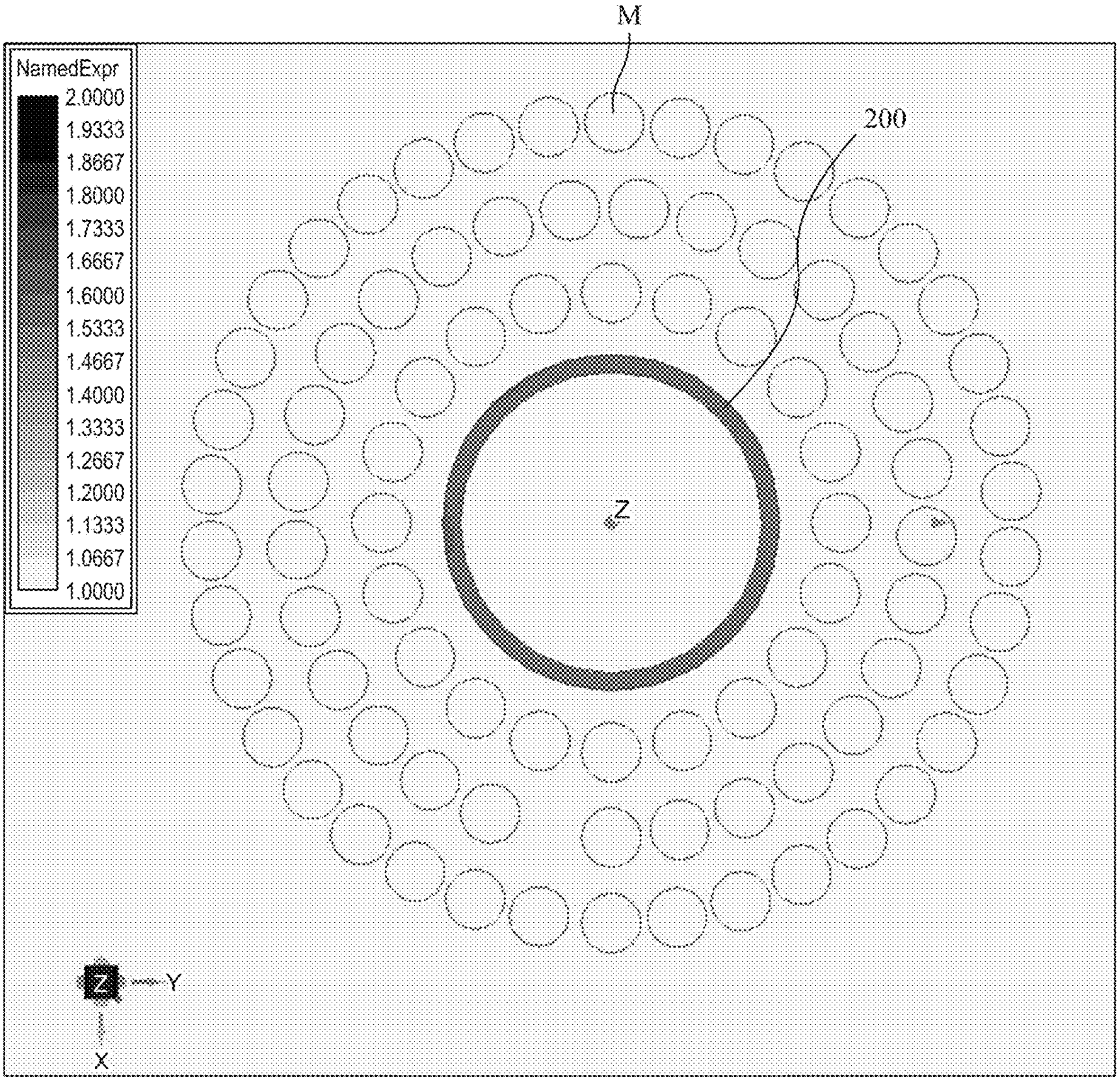
FIG. 8H is a distribution of the magnetic-flux density of the object in a direction perpendicular to the axis after magnetizing has been performed on the magnetization device according to the second modified example of Embodiment 1 (a cross-sectional surface of a planar surface perpendicular to the axis)
Figure 9:
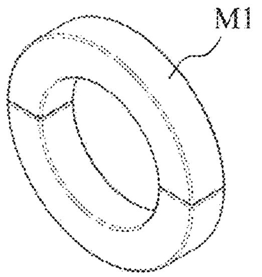
FIG. 9 is an exemplary configuration of a magnet used in a conventional measuring method.

FIG. 8G and FIG. 8H indicate an example of after magnetization has been performed by a magnetization device of a second modified example according to Embodiment 1. In the second modified example, the ring-shaped portion 20 has three layers (that is, an additional layer is arranged further outside of the outer ring-shaped portion 20*a*). FIG. 8G indicates a distribution of a magnetic-flux density of the object 200 in the axial direction on a cross-sectional surface of a planar surface including the axis of the object 200, and FIG. 8H indicates a distribution of the magnetic-flux density of the object 200 in the direction perpendicular to the axis on a cross-sectional surface of a planar surface perpendicular to the axis of the object 200.

By comparing FIG. 8A with FIG. 8G, and compare FIG. 8B with FIG. 8H, it can be seen that the layers of the ring-shaped portion 20 have increased, and therefore, by the number of the magnets M having increased, the magnetization capability has strengthened. Thus, the magnetization capability is easily adjustable according to the required magnetization amount.

In the above-described Embodiment 1, modification as the following can be further made. In the unit component 11, by attaching a smoothing member to a portion (a surface opposed to the object 200, for example) in contact with the object 200, the contact with the object 200 can be further smoothened. The smoothing member can be constituted of resin, for example, and can be fixed to the unit component 11 using adhesive tape.

The coupling component 30 is not limited to the one using a screw such as the coupling screw 31, and any lock mechanism may be used. For example, a use of a buckle and a hinge is possible.

The structure for coupling the unit component 11 is not limited to the one using the hinge 14. As long as the adjacent unit components 11 can turn or move with respect to one another, any known coupling structure can be used.

The fixing method of the magnets M to the unit component 11 is appropriately changeable. For example, the fixing of the pedestal 12 and the fixed component 13 may be realized without a screw such as the fixation screw 15. Alternately, the pedestal 12 and the fixed component 13 can be constituted of a single component or three or more components.

In Embodiment 1, the respective unit components 11 are configured such that they are each able to hold the maximum of one magnet M. However, as a modified example, it may be configured such that the unit components 11 can each hold a plurality of the magnets M.

A handle may be attached to the magnet holding device 10 or the magnetization device 100. Thus, conveyance and operation become easier. The handle can have a configuration similar to that of the handle 350 illustrated in FIG. 10A and FIG. 10B, for example.

DESCRIPTION OF SYMBOLS

M Magnet
10 Magnet holding device
11 Unit component
12 Pedestal
12*a* Connecting hole
13 Fixed component
13*a* Connecting hole
14 Hinge
14*a* Connecting hole
15 Fixation screw
16 Coupling screw
20 Ring-shaped portion (20*a*: Outer ring-shaped portion, 20*b*: Inner ring-shaped portion)
30 (30*a*, 30*b*, 30*c*) Coupling component
31 Coupling screw
32 (32*a*) Supporting member
33 Opening/closing screw
100 Magnetization device
200 Object
201 Marking

What is claimed is:

1. A magnet holding device capable of holding a magnet, comprising:
a ring-shaped portion that is openable/closable; and
an open/close mechanism allowed to keep the ring-shaped portion in a closed state,
wherein at least one magnet is arrangeable in the ring-shaped portion, and a number of the magnets to be arranged is variable,
wherein the ring-shaped portion includes a plurality of unit components,
wherein each of the unit components is capable of holding the magnet, and
wherein each of the unit components is rotatably coupled to another adjacent unit component of the plurality of unit components.

2. The magnet holding device according to claim 1,
wherein the magnet has a columnar shape, and a plurality of the magnets are arrangeable along a circumferential direction of the ring-shaped portion.

3. The magnet holding device according to claim 1,
wherein a number of the unit components included in the ring-shaped portion is variable to change a size of the ring-shaped portion.

4. The magnet holding device according to claim 3,
wherein a magnetization amount by the magnets is changeable by changing a number of the magnets.

5. The magnet holding device according to claim 1,
wherein the open/close mechanism includes a coupling component disposed in both ends in the circumferential direction of the ring-shaped portion.

6. A magnetization device comprising:
the magnet holding device according to claim 1; and
at least one magnet to be arranged in the magnet holding device.

7. A magnetizing method of magnetizing an object using the magnetization device according to claim 6, comprising:
arranging the object in the ring-shaped portion in a state where the ring-shaped portion is open;
attaching the magnetization device to the object by closing the ring-shaped portion using the open/close mechanism after the arranging;
relatively moving the magnetization device with respect to the object in a state where the magnetization device is attached to the object;
opening the ring-shaped portion using the open/close mechanism after the moving; and
detaching the magnetization device from the object after the opening.

8. A magnetizing method of magnetizing an object using a magnetization device, the magnetization device comprising:
a magnet holding device capable of holding a magnet; and
at least one magnet to be arranged in the magnet holding device,
wherein the magnet holding device comprises:
a ring-shaped portion that is openable/closable; and
an open/close mechanism allowed to keep the ring-shaped portion in a closed state,
wherein at least one magnet is arrangeable in the ring-shaped portion, and a number of the magnets to be arranged is variable,
wherein the method comprises:
arranging the object in the ring-shaped portion in a state where the ring-shaped portion is open;
attaching the magnetization device to the object by closing the ring-shaped portion using the open/close mechanism after the arranging;
relatively moving the magnetization device with respect to the object in a state where the magnetization device is attached to the object;
opening the ring-shaped portion using the open/close mechanism after the moving; and
detaching the magnetization device from the object after the opening.

* * * * *